US007986420B2

(12) United States Patent
Harris

(10) Patent No.: US 7,986,420 B2

(45) Date of Patent: Jul. 26, 2011

(54) SENSING PAPER JAM, OUT-OF-PAPER, AND COVER OPEN IN A PRINTER

(75) Inventor: Richard Hunter Harris, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 1274 days.

(21) Appl. No.: 11/564,544

(22) Filed: Nov. 29, 2006

(65) Prior Publication Data

US 2008/0123126 A1 May 29, 2008

(51) Int. Cl.
*G06K 15/00* (2006.01)

(52) U.S. Cl. ... 358/1.14; 358/1.15; 347/104; 400/613.1; 400/614

(58) Field of Classification Search .................... 400/61, 400/76, 82, 248.1, 582, 605, 618, 613.1, 400/614; 358/1.14, 1.15, 1.16; 700/9, 13, 700/79; 710/19; 347/104; 399/16
See application file for complete search history.

(56) References Cited

U.S. PATENT DOCUMENTS

| | | | | | |
|---|---|---|---|---|---|
| 5,863,139 | A | * | 1/1999 | Asai et al. | 400/248.1 |
| 6,030,133 | A | * | 2/2000 | Endo | 400/82 |
| 6,109,805 | A | * | 8/2000 | Ono et al. | 400/618 |
| 6,198,985 | B1 | * | 3/2001 | Miyasaka et al. | 358/1.15 |
| 6,205,363 | B1 | * | 3/2001 | Miyasaka et al. | 700/9 |
| 6,208,906 | B1 | * | 3/2001 | Miyasaka et al. | 700/79 |
| 6,345,782 | B1 | * | 2/2002 | Nakayama et al. | 400/605 |
| 6,360,135 | B1 | * | 3/2002 | Miyasaka et al. | 700/9 |
| 6,362,896 | B1 | * | 3/2002 | Miyasaka et al. | 358/1.16 |
| 6,443,645 | B1 | * | 9/2002 | Takei et al. | 400/621 |
| 2001/0001130 | A1 | * | 5/2001 | Miyasaka et al. | 700/9 |
| 2001/0001838 | A1 | * | 5/2001 | Miyasaka et al. | 700/9 |
| 2001/0021954 | A1 | * | 9/2001 | Takamizawa et al. | 710/19 |
| 2001/0022912 | A1 | * | 9/2001 | Miyasaka et al. | 400/61 |
| 2001/0024585 | A1 | * | 9/2001 | Koakutsu et al. | 400/76 |
| 2002/0012560 | A1 | * | 1/2002 | Miyasaka et al. | 400/582 |
| 2003/0233154 | A1 | * | 12/2003 | Kobziar | 700/13 |
| 2006/0279757 | A1 | * | 12/2006 | Fukano | 358/1.14 |
| 2007/0104497 | A1 | * | 5/2007 | Kwon | 399/16 |

* cited by examiner

*Primary Examiner* — Twyler L Haskins
*Assistant Examiner* — Nicholas C Pachol
(74) *Attorney, Agent, or Firm* — Yee & Associates, P.C.; Tom Tyson

(57) ABSTRACT

A computer implemented method, data processing system, and computer usable program code are provided for detecting printer conditions. A set of signals are received from a sensor in a printer. A current state of the printer from a plurality of states is detected within the set of signals. Responsive to the current state being a selected state, a response signal is sent to the printer based on a policy. The response signal is a printer condition, which may be a paper jam, out-of-paper, or a cover open condition.

17 Claims, 4 Drawing Sheets

SENSING PAPER JAM, OUT-OF-PAPER, AND COVER OPEN IN A PRINTER

BACKGROUND OF THE INVENTION

1. Field of the Invention

The present invention relates to an improved data processing system and more particularly to a method and apparatus for reporting and handling error conditions in a printer. Still more specifically, the present invention relates generally to a method, data processing system, and computer usable program code for sensing paper movement, out-of-paper, and cover open in a printer.

2. Description of the Related Art

Printers are currently found in many forms, however all printers share common characteristics, such as a print head, a platen, and a control mechanism. The control mechanism controls the motion of the print head relative to the paper, selects a character to be printed, and advances and retracts the paper as necessary.

It is undesirable for a printer to operate without paper. Ink-based printers that are operated without paper will transfer the ink into the platen which may in turn stain the back sides of subsequent sheets of paper and possibly damage print writes in the print head. Thermal printers operated without paper may overheat because paper is used to absorb the heat generated by the print head during printing operations or cause excessive wear to the print head because it is running on the platen rather than the paper. Also, any printer that operates without paper will cause frustration when documents must be reprinted. Most modern printers, therefore, include a control mechanism to stop the printer if paper runs out and to prevent the printer from starting to print unless an adequate paper supply is present. This control mechanism typically includes a limit or proximity switch to detect the presence or absence of paper.

Most modern printers are also enclosed in covers or cases with hinged or removable sections that open for access to the printing and mechanical areas. These printers are not designed to be operated with the cover open, as the internal mechanism may be at high temperature or include numerous moving parts. This situation is especially true in the case of a thermal printer where the print head can be damaged if the print head is driven when the cover is open and the print head is not against the platen and nothing is present to absorb heat from the print head. Therefore, these printers typically include an interlock that will prevent the printer from operating with the cover open. The usual interlock includes a limit or proximity switch used to detect whether the printer is open or closed.

The control switches used to detect paper and determine whether the printer is open must be durable and capable of handling a large number of cycles without failure, as failure of these switches can result in damage to the printer or injury to the operator. As a result, the switches used for these tasks are usually expensive. The use of separate switches for these tasks adds substantial expense to the cost of the printer because of associated hardware costs.

If the paper is not moving when the printer paper feed rollers are driving, either a paper jam is emanate or the paper feed system has failed. In either case, it is important that the system is alerted. Printers can be damaged by severe paper jams and time can be wasted while an operator has to clear the jam and reprint the document. This situation is especially important in point-of-sale printers. For example, IBM's Model 3 point-of-sale printer uses a roller driving an emitter wheel to monitor paper motion to ensure reliable journal printing.

Separate emitter wheel mechanisms to track paper movement, cover open sensors, and paper out sensors complicate the printer design, increase total printer cost and can reduce the reliability of the printer.

BRIEF SUMMARY OF THE INVENTION

The different illustrative embodiments provide a computer implemented method, data processing system, and computer usable program code for detecting printer conditions. The illustrative embodiments receive a set of signals from a sensor in a printer. The illustrative embodiments detect within the set of signals a current state of the printer from a set of states. The illustrative embodiments send a response signal to the printer based on a policy in response to the current state being a selected state. The response signal is a printer condition, which may be a paper jam, out-of-paper, or a cover open condition.

BRIEF DESCRIPTION OF THE SEVERAL VIEWS OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE INVENTION

Figure 1:
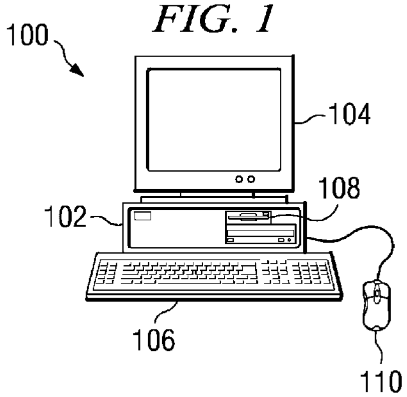
FIG. 1 shows a pictorial representation of a data processing system in which illustrative embodiments may be implemented.

The illustrative embodiments provide a single sensor that provides unique signals for paper jam, paper out, and open cover conditions. With reference now to the figures and in particular with reference to FIG. 1, a pictorial representation of a data processing system is shown in which illustrative embodiments may be implemented. Computer 100 includes system unit 102, video display terminal 104, keyboard 106, storage devices 108, which may include floppy drives and other types of permanent and removable storage media, and mouse 110. Additional input devices may be included with personal computer 100. Examples of additional input devices include a joystick, touchpad, touch screen, trackball, microphone, and the like.

Computer 100 may be any suitable computer, such as an IBM® eServer™ computer or IntelliStation® computer, which are products of International Business Machines Corporation, located in Armonk, N.Y. Computer 100 may also be a Point of Sale system with additional input devices such as optical scanner, magnetic card reader, special terminals, and printers. Although the depicted representation shows a personal computer, other embodiments may be implemented in other types of data processing systems. For example, other embodiments may be implemented in a network computer. Computer 100 also preferably includes a graphical user interface (GUI) that may be implemented by means of systems software residing in computer readable media in operation within computer 100.

Figure 2:
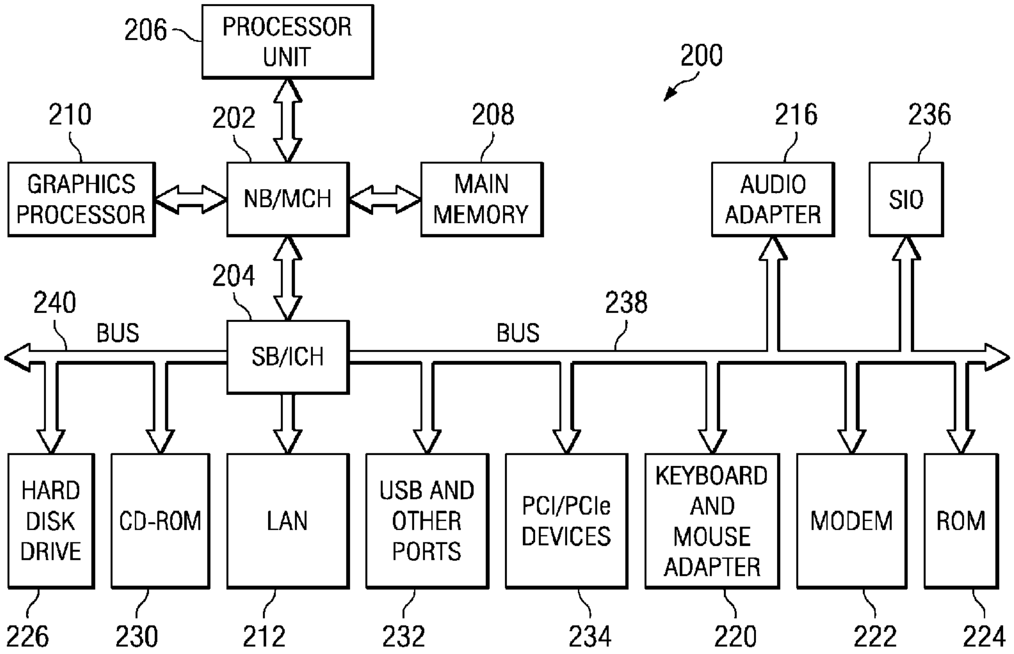
FIG. 2 depicts a block diagram of a data processing system in which illustrative embodiments may be implemented.

Next, FIG. 2 depicts a block diagram of a data processing system in which illustrative embodiments may be implemented. Data processing system 200 is an example of a computer, such as computer 100 in FIG. 1, in which code or instructions implementing the processes of the illustrative embodiments may be located.

In the depicted example, data processing system 200 employs a hub architecture including a north bridge and memory controller hub (MCH) 202 and a south bridge and input/output (I/O) controller hub (ICH) 204. Processing unit 206, main memory 208, and graphics processor 210 are coupled to north bridge and memory controller hub 202. Processing unit 206 may contain one or more processors and even may be implemented using one or more heterogeneous processor systems. Graphics processor 210 may be coupled to the MCH through an accelerated graphics port (AGP), for example.

In the depicted example, local area network (LAN) adapter 212 is coupled to south bridge and I/O controller hub 204, audio adapter 216, keyboard and mouse adapter 220, modem 222, read only memory (ROM) 224, universal serial bus (USB) ports, and other communications ports 232. PCI/PCIe devices 234 are coupled to south bridge and I/O controller hub 204 through bus 238. Hard disk drive (HDD) 226 and CD-ROM drive 230 are coupled to south bridge and I/O controller hub 204 through bus 240.

PCI/PCIe devices may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM drive 230 may use, for example, an integrated drive electronics (IDE) or serial advanced technology attachment (SATA) interface. A super I/O (SIO) device 236 may be coupled to south bridge and I/O controller hub 204.

An operating system runs on processing unit 206. This operating system coordinates and controls various components within data processing system 200 in FIG. 2. The operating system may be a commercially available operating system, such as Microsoft® Windows XP®. (Microsoft® and Windows XP® are trademarks of Microsoft Corporation in the United States, other countries, or both). An object oriented programming system, such as the Java™ programming system, may run in conjunction with the operating system and provides calls to the operating system from Java™ programs or applications executing on data processing system 200. Java™ and all Java-based trademarks are trademarks of Sun Microsystems, Inc. in the United States, other countries, or both.

Instructions for the operating system, the object-oriented programming system, and applications or programs are located on storage devices, such as hard disk drive 226. These instructions and may be loaded into main memory 208 for execution by processing unit 206. The processes of the illustrative embodiments may be performed by processing unit 206 using computer implemented instructions, which may be located in a memory. An example of a memory is main memory 208, read only memory 224, or in one or more peripheral devices.

The hardware shown in FIG. 1 and FIG. 2 may vary depending on the implementation of the illustrated embodiments. Other internal hardware or peripheral devices, such as flash memory, equivalent non-volatile memory, or optical disk drives and the like, may be used in addition to or in place of the hardware depicted in FIG. 1 and FIG. 2. Additionally, the processes of the illustrative embodiments may be applied to a multiprocessor data processing system.

The systems and components shown in FIG. 2 can be varied from the illustrative examples shown. In some illustrative examples, data processing system 200 may be a personal digital assistant (PDA). A personal digital assistant generally is configured with flash memory to provide a non-volatile memory for storing operating system files and/or user-generated data. Additionally, data processing system 200 can be a tablet computer, laptop computer, Point of Sale device, or telephone device. Point of Sale devices may be devices, such as cash registers, optical scanner, magnetic card reader, special terminals, and printers.

Other components shown in FIG. 2 can be varied from the illustrative examples shown. For example, a bus system may be comprised of one or more buses, such as a system bus, an I/O bus, and a PCI bus. Of course the bus system may be implemented using any suitable type of communications fabric or architecture that provides for a transfer of data between different components or devices attached to the fabric or architecture. Additionally, a communications unit may include one or more devices used to transmit and receive data, such as a modem or a network adapter. Further, a memory may be, for example, main memory 208 or a cache such as found in north bridge and memory controller hub 202. Also, a processing unit may include one or more processors or CPUs.

The depicted examples in FIG. 1 and FIG. 2 are not meant to imply architectural limitations. In addition, the illustrative embodiments provide for a computer implemented method, apparatus, and computer usable program code for compiling source code and for executing code. The methods described with respect to the depicted embodiments may be performed in a data processing system, such as data processing system 100 shown in FIG. 1 or data processing system 200 shown in FIG. 2.

The illustrative embodiments provide for detecting states in a printer, such as, for example, cover open, paper out, and paper jam conditions using a single optical sensor in a printer. Using the optical sensor to perform detecting different states provides improved reliability over existing single function sensors in which a separate sensor is used to detect a different state in the printer. In the illustrative embodiments, an optical sensor provides a single interface that allows firmware to distinguish between cover open, paper out, and paper jam conditions. Additionally, a single optical sensor may cost much less than using numerous switches to perform detection of states, such as cover open, paper out, and paper jam detection. Therefore, implementing a common optical sensor provides considerable printer product cost reduction.

Figure 3:
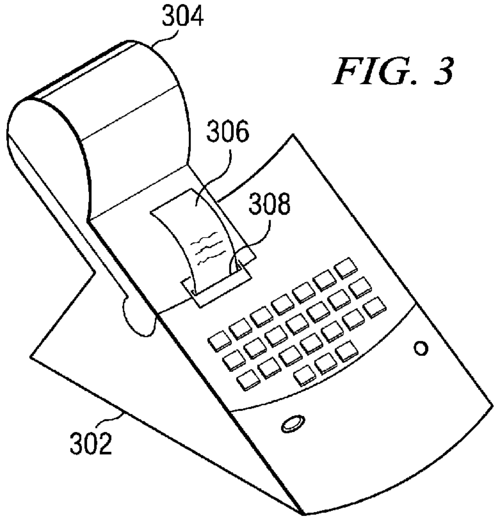
FIG. 3 depicts an exemplary printer in which the optical sensor may be implemented in accordance with an illustrative embodiment.

FIG. 3 depicts an exemplary printer in which the optical sensor may be implemented in accordance with an illustrative embodiment. Printer 300 includes base unit 302, cover 304, and paper 306. Paper 306 is within base unit 302 and covered with cover 304. Paper 306 is printed within the base unit and exits printer 300 through slot 308 in cover 304. Printer 300 is an exemplary printer which is shown to be a stand-alone printer; however, printer 300 may also be part of a cash register, optical scanner, magnetic card reader, special terminal or other Point of Sale device.

Figure 4:
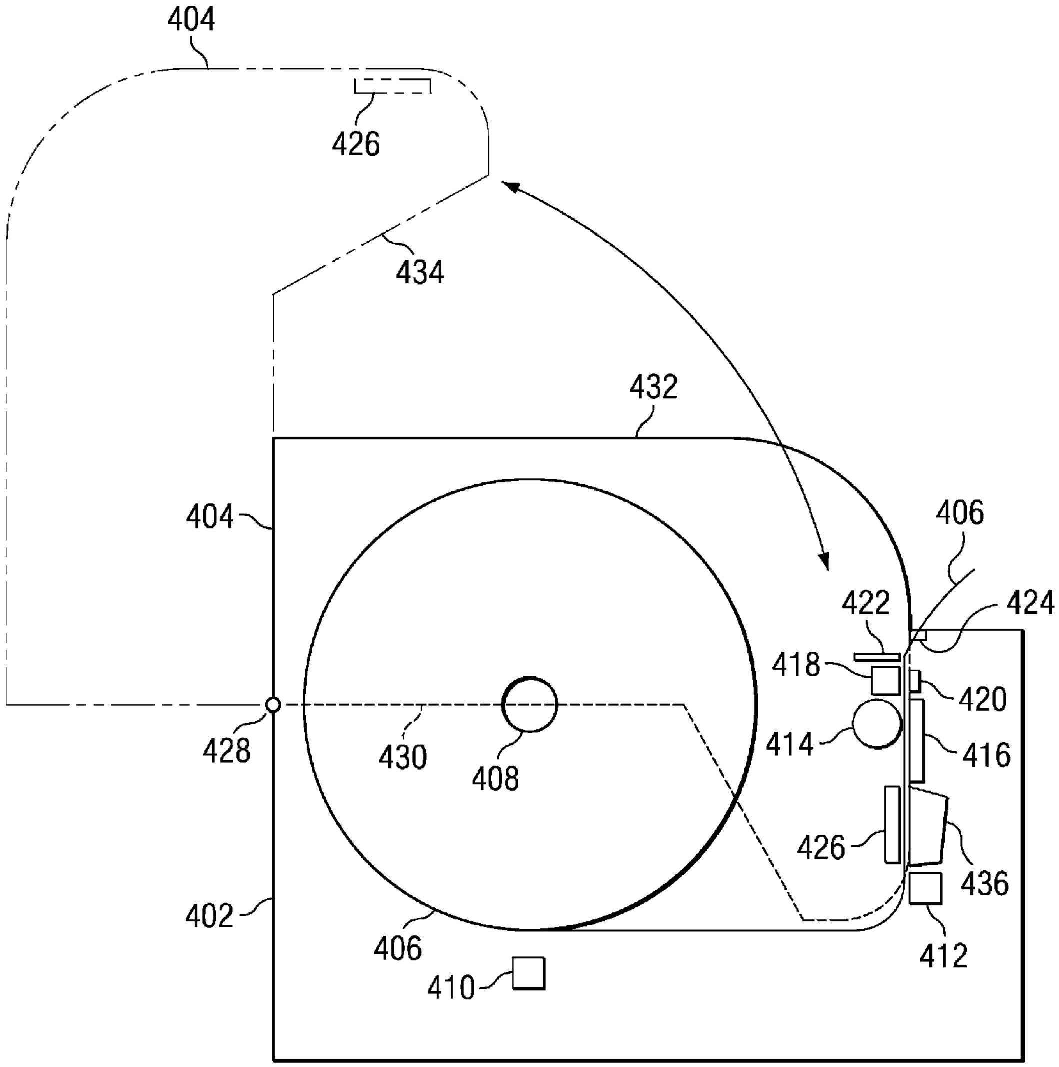
FIG. 4 illustrates the implementation of a single optical sensor in a printer in accordance with an illustrative embodiment.

FIG. 4 illustrates the implementation of a single optical sensor in a printer in accordance with an illustrative embodiment. Printer 400 includes base unit 402, cover 404, and paper 406. Paper 406 in this example is a rolled up on paper roll 408 and paper 406 is a type of paper that is commonly used in Point of Sale devices. Paper 406 feeds through a path in printer 400 such that it passes by low paper sensor 410 and black mark sensor 412, around roller 414, by thermal print head 416, between cutter 418 and cutter base 420, by cutter sensor 422 and through slot 424 where the paper exits printer 400. Low paper sensor 410 senses when the paper is low on paper roll 408. Black mark sensor 412 senses preprinted targets on paper 406 so that the print may align with preprinted form. Roller 414 allows paper to pass between roller 414 and thermal print head 416 so that paper 406 may be printed with information. Cutter 418 cuts paper 406 when appropriate by pressing a blade or other sharp implement within cutter 418 against cutter base 420. Cutter sensor 422 detects that cutter 418 and cutter base 420 have separated and that the paper path is open to allow paper 406 to be fed.

The illustrative embodiments provide optical sensor 426 that is a single optical sensor, which is able to detect cover open, paper out, and paper jam conditions. Optical sensor 426 is attached to cover 404 that pivots around pivot point 428 on the end of cover parting line 430. Optical sensor 426 sends signals based on conditions encountered during the operation of printer 400. In these examples, optical sensor 426 uses a light source to bounce light off of a surface onto a sensor, such as a single light emitting diode (LED) that bounces light off of surfaces onto one or more complimentary metal-oxide semiconductor (CMOS) sensors, although any type of light source and sensor may be used. The sensors track the movement of objects by scanning the surfaces approximately 1500 times every second.

The images taken by optical sensor 426 may be passed on to a processing unit, such as processing unit 206 of FIG. 2, or to a microprocessor near the sensor which analyzes the images for differences. Optical sensor 426 may detect patterns in the images and see how those patterns have moved since the previous image. Based on the change in patterns over a sequence of images it can determine if the paper is moving, the direction the paper is moving, and at what speed the paper is moving.

Based on optical sensor 426 detecting patterns in the images, the processing unit is able to detect numerous states, such as: a blank field state, paper motion-up state, and paper motion-down state. Paper motion is detected by ensuring the paper motion-up state exists while the paper feed system is commanded to feed paper 406. If the paper motion-up state fails while the paper feed system is commanded to feed paper 406, a paper jam is detected.

A cover open condition is detected when a short paper motion-down state is followed by a blank field state. As cover 404 is opened from position 432 to position 434, optical sensor 426 will move relative to paper 406 in a fashion that would appear to optical sensor 426 that paper 406 is moving down creating a paper motion-down state and the blank field state would occur when optical sensor 426 to paper gap is greater than the focal length of the optical system in optical sensor 426. As long as cover 404 is open the blank field state remains. Deep aperture 436 is sufficiently deep so that its bottom surface is greater than the focal length of the optical system in optical sensor 426. Closing cover 404 when paper 406 is present causes a blank field state to be followed by a paper motion-up state. If cover 404 is closed without any of paper 406 in the paper path, optical sensor 426 senses paper motion-up as it passes print head 416, between cutter 418 and cutter base 420, and part of base 402 followed by a blank field state which would persist since deep aperture 436 is now opposite optical sensor 426.

Additionally, optical sensor 426 is able to detect paper out conditions. An out-of-paper condition is detected when a blank field state occurs after the paper motion-up state or a blank field state exists without being preceded by a paper motion-down state. While the illustrative embodiments describe the detection of three states, states other than those given as examples may be detected based on image information detected by optical sensor 426.

Figure 5A:
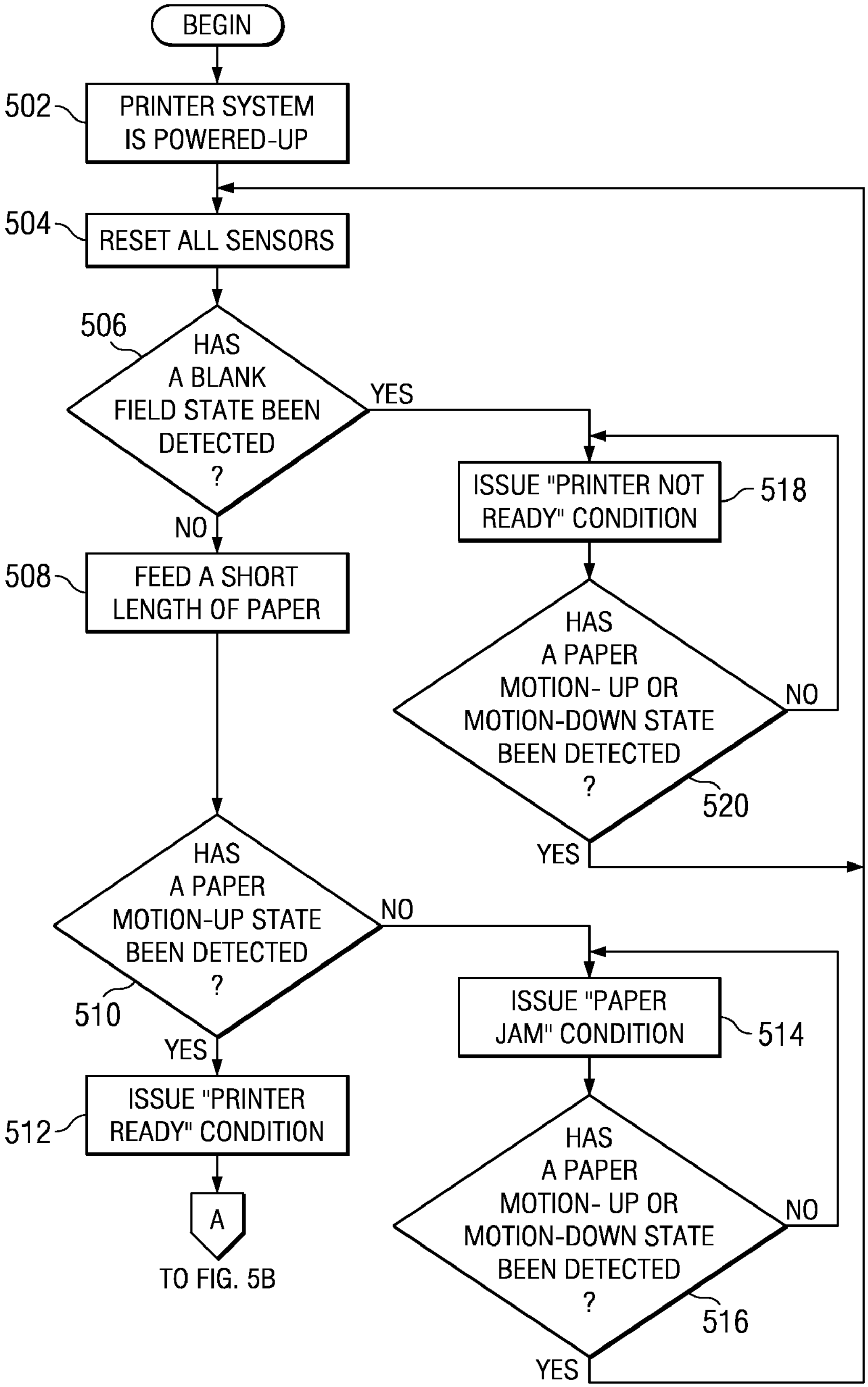
FIG. 5A depicts the flowchart of an operation for initializing a printer using a single optical sensor in accordance with an illustrative embodiment.

FIG. 5A depicts the flowchart of an operation for initializing a printer using a single optical sensor in accordance with an illustrative embodiment. A processing unit, such as processing unit 206 of FIG. 2, executing instructions, detects the states using the optical sensor, such as optical sensor 426 in FIG. 4. As the operation begins, a printer system is powered-up (step 502). An initial state of the printer is determined starting with the processing unit resetting all of the sensors in the printer (step 504). Then, the processing unit, using the optical sensor, determines whether a blank field state is detected (step 506). If at step 506 a blank field state is not detected, the processing system feeds a short length of paper (step 508). Then, the processing unit, using the optical sensor, determines whether a paper motion-up state is detected (step 510). If at step 510, a paper motion-up state is detected, the processing unit issues a "Printer Ready" condition (step 512) with the operation continuing to FIG. 5B. If at step 510 a paper motion-up state is not detected, then the processing system issues a "Paper Jam" condition (step 514) and the processing unit, using the optical sensor, determines whether a paper motion-up or motion-down state is detected (step 516). If paper motion-up or motion-down is detected, the operation returns to step 504. If a paper motion-up or motion-down state is not detected at step 516, then the operation returns to step 514 and continues to cycle through steps 516 and 514 to wait for a paper motion-up or motion-down state to be detected.

Returning to step 506, if a blank field state is detected, then either the cover is open or the cover is closed and paper is not present, the processing unit issues a "Printer Not Ready" condition (step 518). Then, the processing unit, using the optical sensor, determines whether a paper motion-up or motion-down state has been detected (step 520). If a paper motion-up or motion-down state is not detected, then the processing unit issues a "Printer not Ready" condition (step 518) and the operation cycles through steps 518 and 520 to wait for a paper motion-up or motion-down state to be detected. If at step 520 a paper motion-up or motion-down state is detected, then the operation returns to step 504.

Figure 5B:
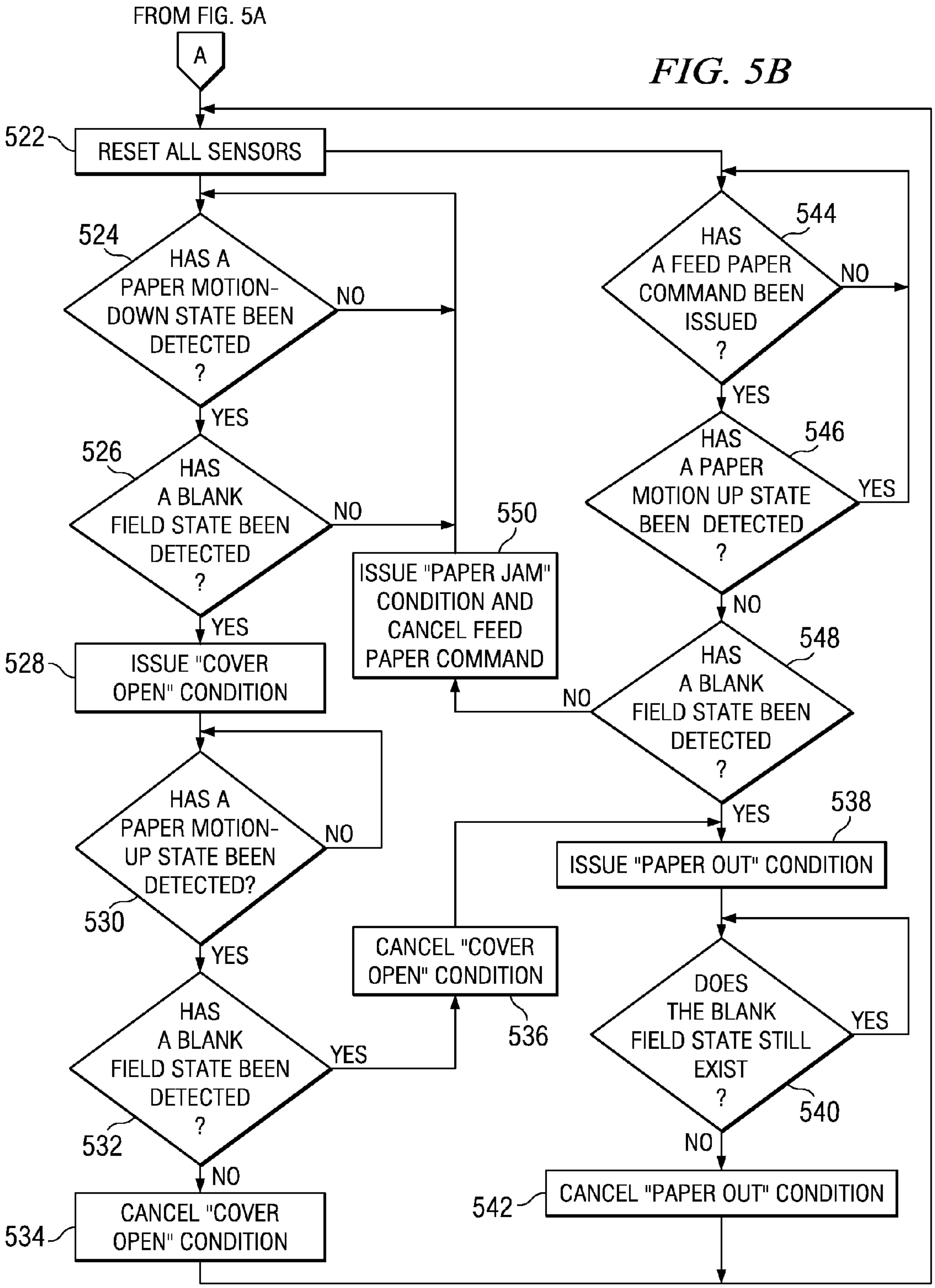
FIG. 5B depicts the flowchart of an operation for detecting states using a single optical sensor in accordance with an illustrative embodiment.

FIG. 5B depicts the flowchart of an operation for detecting states using a single optical sensor in accordance with an illustrative embodiment. Once a "Printer Ready" condition is issued at step 512 of FIG. 5A, all of the sensors are reset including the optical sensor (step 522). Then, the processing unit, using the optical sensor, may detect cover open, paper out, and paper jam conditions. In detecting a cover open condition, the processing unit, using the optical sensor, determines whether a paper motion-down state has been detected (step 524). If a paper motion-down state has not occurred, the operation returns to step 524. If a paper motion-down state has occurred at step 524, the processing unit, using the optical sensor, determines whether a blank field state is detected (step 526). If a blank field state is not detected, the operation returns to step 524. If a blank field state is detected at step 526, the processing unit issues a "Cover Open" condition (step 528).

Then, the processing unit, using the optical sensor, determines if a paper motion-up state is detected (step 530). If a paper motion-up state is not detected, then the processing unit, using the optical sensor, waits to detect a paper motion-up state at step 530 until a paper motion-up state is detected. If at step 530 a paper motion-up state is detected, then the processing unit, using the optical sensor, determines if the blank field state is detected (step 532). If the blank field state is not detected, then the processing unit cancels the "Cover Open" condition (step 534). If at step 532 a blank field state is detected, then the processing unit cancels the "Cover Open" condition (step 536) and issues a "Paper Out" condition (step 538). The processing unit, using the optical sensor, determines if a blank field state still exists (step 540). If a blank field state still exists, the operation returns to step 540. If a blank field state no longer exists at step 540, the processing unit cancels the "Paper Out" condition (step 542) and the operation returns to step 522 where the sensors are reset.

In detecting paper jam or paper out conditions, a determination is made by the processing unit as to whether a feed paper command is issued (step 544). If the feed paper command has not been issued, the operation returns to step 544. If the feed paper command has been issued at step 544, the processing unit, using the optical sensor, determines if a paper motion-up state is detected (step 546). If a paper motion-up state is detected, the operation returns to step 544. If a paper motion-up state detection is above a predetermined limit but below the specified paper motion-up, printing could continue while a marginal paper jam is issued providing data that would indicate an impending or predictive paper feed failure. If a paper motion-up state is not detected at step 546, the processing unit, using the optical sensor, determines whether the optical sensor has detected a blank field state (step 548). If a blank field state is not detected, the processing unit issues a "Paper Jam" condition and cancels any feed paper commands (step 550), and the operation returns to step 524 where the cover is opened to fix the paper jam.

If a blank field state is detected at step 548, the processing unit issues a "Paper Out" condition (step 538). The processing unit, using the optical sensor, determines if a blank field state still exists (step 540). If a blank field state still exists, the operation returns to step 540. If a blank field state no longer exists at step 540, the processing unit cancels the "Paper Out" condition (step 542) and the operation returns to step 522 where the sensors are reset.

Thus, the illustrative embodiments provide for detecting cover open, paper out, and paper jam conditions using an optical sensor in a printer. Such an optical sensor, performing the combined functions, provides improved reliability over existing single function sensors. An optical sensor provides a single interface that allows firmware to distinguish between cover open, paper out, and paper jam conditions.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device). Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method for detecting printer conditions, the computer implemented method comprising:

receiving a set of images from an optical sensor in a printer;

identifying within the set of images a first current state of the printer from a plurality of states;

identifying within the set of images a second current state of the printer from the plurality of states; and responsive to identifying the first current state followed by the second current state, sending a printer condition to the printer; wherein:

when the first current state is a paper motion-down state, the second current state is a blank field state, the second current state immediately follows the first current state, and the printer condition is a cover open condition; or when the first current state is a first paper motion-up state, the second current state is a blank field state and the printer condition is a paper jam condition; or when the first current state is a paper motion-up state, the second current state is a blank field state, the second current state immediately follows the first current state, and the printer condition is a paper out condition.

2. The computer implemented method of claim 1, further comprising:

identifying a third current state, wherein the third current state is a paper motion-up state;

determining if the second current state still exists; and responsive to detecting the third current state followed by an elimination of the second current state, cancelling the cover open condition.

3. The computer implemented method of claim 1, further comprising:

receiving a paper feed command.

4. The computer implemented method of claim 3, further comprising:

identifying a third current state, wherein the third current state is a paper motion-down state;

identifying a fourth current state, wherein the fourth current state is a blank field state and wherein the fourth current state immediately follows the third current state; and responsive to detecting the third current state followed by the fourth current state, issuing a cover open condition.

5. The computer implemented method of claim 4, further comprising:

determining if the fourth current state still exists;

identifying a fifth current state, wherein the fifth current state is a second paper motion-up state and wherein the fifth current state immediately follows the fourth current state; and responsive to an elimination of the fourth current state followed by the fifth current state, cancelling the cover open condition and the paper jam condition.

6. The computer implemented method of claim 3, further comprising:

determining if the second current state still exists; and responsive to an absence of the second current state, cancelling the paper out condition.

7. The computer implemented method of claim 1, further comprising:

resetting the plurality of states once the printer condition is cleared.

8. A data processing system comprising:

a bus system;

a communications system connected to the bus system;

a memory connected to the bus system, wherein the memory includes a set of instructions; and a processing unit connected to the bus system, wherein the processing unit executes the set of instructions to receive a set of images from an optical sensor in a printer;

identify within the set of images a first current state of the printer from a plurality of states;

identify within the set of images a second current state of the printer from the plurality of states; and responsive to identifying the first current state followed by the second current state, send a printer condition to the printer; wherein:

when the first current state is a paper motion-down state, the second current state is a blank field state, the second current state immediately follows the first current state, and the printer condition is a cover open condition; or when the first current state is a first paper motion-up state, the second current state is a blank field state and the printer condition is a paper jam condition; or when the first current state is a paper motion-up state, the second current state is a blank field state, the second current state immediately follows the first current state, and the printer condition is a paper out condition.

9. The data processing system of claim 8 wherein the processing unit further executes the set of instructions to:

identify a third current state, wherein the third current state is a paper motion-up state;

determine if the second current state still exists; and responsive to detecting the third current state followed by an elimination of the second current state, cancel the cover open condition.

10. The data processing system of claim 8 wherein the processing unit further executes the set of instructions to:

receive a paper feed command.

11. The data processing system of claim 10 wherein the processing unit further executes the set of instructions to:

identify a third current state, wherein the third current state is a paper motion-down state;

identify a fourth current state, wherein the fourth current state is a blank field state and wherein the fourth current state immediately follows the third current state; and responsive to detecting the third current state followed by the fourth current state, issue a cover open condition.

12. The data processing system of claim 11 wherein the processing unit further executes the set of instructions to:

determine if the fourth current state still exists;

identify a fifth current state, wherein the fifth current state is a second paper motion-up state and wherein the fifth current state immediately follows the fourth current state; and responsive to an elimination of the fourth current state followed by the fifth current state, cancel the cover open condition and the paper jam condition.

13. The data processing system of claim 10 wherein the processing unit further executes the set of instructions to:

determine if the second current state still exists; and responsive to an absence of the second current state, cancel the paper out condition.

14. The data processing system of claim 8 wherein the processing unit further executes the set of instructions to:

reset the plurality of states once the printer condition is cleared.

15. A computer readable storage device including computer usable program code for detecting printer conditions, the computer readable storage device including:

computer usable program code for receiving a set of images from an optical sensor in a printer;

computer usable program code for identifying within the set of images a first current state of the printer from a plurality of states;

computer usable program code for identifying within the set of images a second current state of the printer from the plurality of states; and computer usable program code for sending a printer condition to the printer in response to identifying the first current state followed by the second current state;

when the first current state is a paper motion-down state, the second current state is a blank field state, the second current state immediately follows the first current state, and the printer condition is a cover open condition; or when the first current state is a first paper motion-up state, the second current state is a blank field state and the printer condition is a paper jam condition; or when the first current state is a paper motion-up state, the second current state is a blank field state, the second current state immediately follows the first current state, and the printer condition is a paper out condition.

16. The computer readable storage device of claim 15 further including:

computer usable program code for identifying a third current state, wherein the third current state is a paper motion-up state;

computer usable program code for determining if the second current state still exists; and computer usable program code for, responsive to detecting the third current state followed by an elimination of the second current state, cancelling the cover open condition.

17. The computer readable storage device of claim 15 further including:

computer usable program code for identifying a third current state, wherein the third current state is a paper motion-down state;

computer usable program code for identifying a fourth current state, wherein the fourth current state is a blank field state and wherein the fourth current state immediately follows the third current state; and computer usable program code for, responsive to detecting the third current state followed by the fourth current state, issuing a cover open condition.

* * * * *